(12) United States Patent
Welker et al.

(10) Patent No.: US 10,052,831 B2
(45) Date of Patent: Aug. 21, 2018

(54) WAVE GUIDING ELEMENT AND METHOD OF MANUFACTURE

(71) Applicant: Incom, Inc., Charlton, MA (US)

(72) Inventors: David James Welker, Vancouver, WA (US); Eric Robert Davidson, Vancouver, WA (US); Kristopher Alan Baur, Portland, OR (US); Stephan Patrick Nelsen, Vancouver, WA (US); Evan Franklin DeBlander, Portland, OR (US); Zachary David Welker, Vancouver, WA (US)

(73) Assignee: Incom, Inc., Charlton, MA (US)

( * ) Notice: Subject to any disclaimer, the term of this patent is extended or adjusted under 35 U.S.C. 154(b) by 108 days.

(21) Appl. No.: 15/213,022

(22) Filed: Jul. 18, 2016

(65) Prior Publication Data

US 2017/0016996 A1    Jan. 19, 2017

Related U.S. Application Data (60) Provisional application No. 62/193,857, filed on Jul. 17, 2015.

(51) Int. Cl.
| | |
|---|---|
| *G01T 1/20* | (2006.01) |
| *B29D 11/00* | (2006.01) |
| *G02B 6/02* | (2006.01) |
| *B29K 25/00* | (2006.01) |
| *B29K 33/00* | (2006.01) |

(52) U.S. Cl.
CPC ........ *B29D 11/00682* (2013.01); *G01T 1/201* (2013.01); *G02B 6/02* (2013.01); *B29K 2025/04* (2013.01); *B29K 2033/12* (2013.01)

(58) Field of Classification Search
CPC .................................. G01T 1/201; G01L 1/20
USPC ....................................................... 250/487.1
See application file for complete search history.

(56) References Cited

U.S. PATENT DOCUMENTS

| | | |
|---|---|---|
| 3,870,399 A | 3/1975 | Randall et al. |
| 6,078,052 A | 6/2000 | DiFilippo |
| 7,209,616 B2 | 4/2007 | Welker et al. |
| 8,119,709 B2 | 2/2012 | Schneider et al. |
| 2004/0168476 A1 | 9/2004 | Chen et al. |
| 2005/0094954 A1 | 5/2005 | Pickrell et al. |

(Continued)

OTHER PUBLICATIONS

Salman Karbasi et al., "Fabrication and Characterization of Disordered Polymer Optical Fibers for Transverse Anderson Localization of Light", Journal of Visualized Experiments, Jul. 2013.

(Continued)

*Primary Examiner* — David Porta
*Assistant Examiner* — Meenakshi Sahu
(74) *Attorney, Agent, or Firm* — BainwoodHuang (57) ABSTRACT

A wave guide face plate for transmitting an image formed in a scintillating material included as part of a transmitting medium is disclosed. The transmitting medium includes a random distribution of different refractive index regions in two orthogonal dimensions, and an essentially consistent refractive index in a third orthogonal dimension. The third orthogonal direction is aligned with a transmission axis of the wave transmitter extending from an input location to a wave detector location. The transmission efficiency of the wave guide faceplate is improved in situations where the entry angle of the input radiation is different from the axis of the wave transmitter as compared to conventional faceplates.

19 Claims, 7 Drawing Sheets

(56) References Cited

U.S. PATENT DOCUMENTS

| | | |
|---|---|---|
| 2006/0204186 A1 | 9/2006 | Tammela et al. |
| 2013/0163942 A1 | 6/2013 | Wiersma et al. |
| 2013/0170802 A1 | 7/2013 | Pitwon |
| 2013/0195410 A1 | 8/2013 | Karbasivalashani et al. |
| 2014/0277294 A1 | 9/2014 | Jones et al. |

OTHER PUBLICATIONS

Arash Mafi, "Transverse Anderson localization of light: a tutorial", Advances in Optics and Photonics 7, 459-515 (2015).
Hans De Raedt et al., "Transverse Localization of Light", Physical Review Letters, vol. 62, No. 1, Jan. 2, 1989.
International Search Report for PCT/US2016/042815, mailed from ISA/US, Commissioner for Patents dated Nov. 29, 2016, p. 5.

WAVE GUIDING ELEMENT AND METHOD OF MANUFACTURE

BACKGROUND

Wave transmitters, such as electromagnetic fiber optics or acoustic wave guides, are used to transmit information, such as an image, from one location to another. The waves transmitted may be transmitted over a long distance, or may be transmitted along a curved path, and may be transmitted as serial signals or in parallel. The medium of the wave transmitter may be glass, plastic, or metal, and may be single fibers of a single material, single fibers clad with a different material, hollow fibers, or plates made of multiple individual fibers held in parallel.

Photonic fiber optic elements may operate using a mechanism of total internal reflection (i.e., TIR) to prevent most of the photons from escaping from the fiber and to obtain high transmission efficiency. Total internal reflection transmission efficiency is greatest when the emission angle of the photonic radiation to the direction of the axis of the fiber is small, and falls off rapidly with increasing input angle depending on numerical aperture. As a result conventional devices using wave transmitters are typically designed to carefully align the emitter to the input of the individual fiber optic to maintain sufficient transmission levels.

An example of prior art X-ray detector might include a layer of a phosphor compound that emits visible light when struck by an X-ray. The light emitted is partially transmitted to a detector/imager by a faceplate in close contact with the phosphor layer on one side and in close contact with the detector/imager on the other side of the faceplate. Only the photons emitted by the phosphor layer that are closely aligned with the long axis of the individual fibers of the TIR faceplate will be transmitted to the detector/imager.

SUMMARY

Unfortunately, there are deficiencies with the above-described conventional approaches to transmitting information and images from one location to another location, in particular with respect to faceplates or transmission plates. This may be related to problems of TIR faceplates transmitting randomly emitted light (i.e., omnidirectional emission) such as may be found in a scintillator, where the percentage of light emitted along the axis of the individual fibers of the faceplate may be very low, for example 3%, and thus the transmission efficiency is low.

Scintillating and wavelength shifting fibers (single or multiple fibers bundled together) historically have suffered from poor capture efficiencies due to their reliance on total internal reflection (i.e., TIR) as a guiding mechanism of the emitted electromagnetic radiation. The efficiency of TIR faceplates may be determined by the shape of the fibers and a refractive index difference between the core and the cladding. As a result typical capture efficiencies of TIR based faceplates are between 3% and 6% of the emitted light, since scintillation is generally omnidirectional, thus losing the majority of the emitted electromagnetic radiation through the sides of the fibers.

In contrast with the conventional approaches for transmitting information and images, improved techniques include arranging optically transmissive material to provide longitudinal waveguiding with a random transverse distribution of refractive indices effective to localize a transverse extent of conversion light propagating in the optical waveguide, and incorporating a conversion material (e.g., scintillating or wavelength-shifting material) into the optically transmissive material to generate the conversion light by interaction between the conversion material and incident radiation (particle/electromagnetic wave, etc.) received into the optical waveguide. There may be two or more different wave transmitting materials, and/or the presence of gas-filled voids. The guidance of waves in this structure is known as "Transverse Anderson Localization", also referred to herein as "TAL".

The random distribution of refractive index locations transverse to the direction of the third orthogonal axis cause the scintillated or wavelength shifted electromagnetic radiation to travel primarily in the direction of consistent refractive index. This may result in efficient transmission of photons that are emitted at angles with respect to the desired third axis that are much larger than may be obtained with faceplates utilizing the total internal reflection method.

The conversion material may be contained in the transmitting medium, or may be located immediately adjacent to, and separate from the transmitting medium, or in any combination. For example, the transmitting medium may be partially or entirely formed of a scintillating material, or the scintillating material may be embedded in an initial portion of the material forming the faceplate.

Such wave transmitters may be used, for example, in medical imaging to transmit an X-ray image formed on a scintillator layer (i.e., a wavelength shifting material, for example an X-ray to optical light shifting material) to a recording detector where the image may be recorded and analyzed.

In another aspect, a method for forming the TAL material may include mixing two or more materials having different index of refractions in a fashion that is random in two orthogonal directions and essentially uniform in a third orthogonal direction. One method of forming the TAL material may include drawing fibers from at least two different materials and randomly placing them together to form a composite fiber. Then placing together the composite fibers together to form a larger diameter fiber, and repeating until a desired thickness is obtained. In this fashion a random mixture may be formed in the two directions orthogonal to the drawing direction, while the index of refraction will be relatively constant in the drawing direction.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
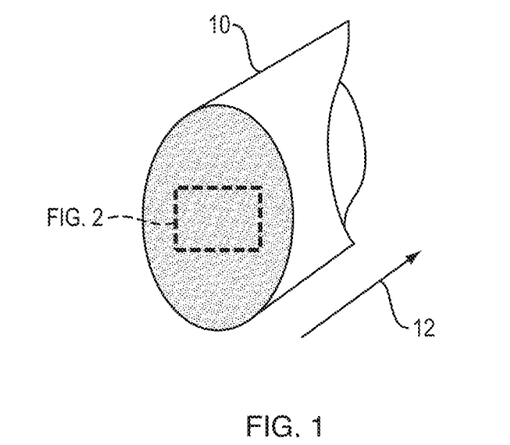
FIG. 1 is a schematic depiction of an optical waveguide.

FIG. 1 is a schematic depiction of an optical waveguide 10, which may be realized in multiple ways as described more below. The waveguide 10 is an arrangement of optically transmissive material that provides longitudinal waveguiding along a transmission axis 12 with a random distribution of refractive indices transverse to the axis 12, i.e., across the two-dimensional extent orthogonal to the axis 12. This arrangement is effective to localize a transverse extent of conversion light propagating in the optical waveguide. It is believed that the waveguiding effect in the waveguide 10 is a phenomenon referred to as "Transverse Anderson Localization", which is referred to herein as TAL. The waveguide 10 is realized without use of separate cladding as is used in other known optical waveguide structures. As described more below, the waveguide 10 also incorporates a conversion material that generates conversion light within the waveguide 10 by interaction with incident radiation received into the optical waveguide. An example of a conversion material is a fluorescent material that emits light when absorbing ionizing radiation.

Figure 2:
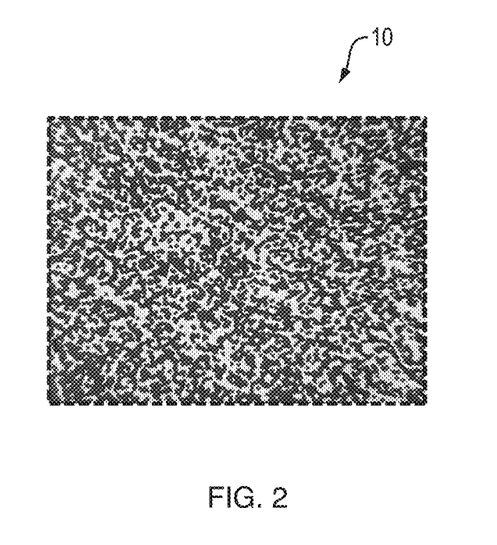
FIG. 2 is an image of a cross-sectional area of the optical waveguide.

FIG. 2 is a magnified view of a section of the optical waveguide 10. In this case the waveguide 10 is composed of two materials, shown in light and dark respectively. The two materials have different indices of refraction. Specific examples are discussed below. The materials are arranged so that the refractive index has an essentially random distribution across the transverse direction. In FIG. 2 the two materials are mixed at approximately a 50/50 ratio. Alternative ratios are possible, as mentioned below.

Figure 3:
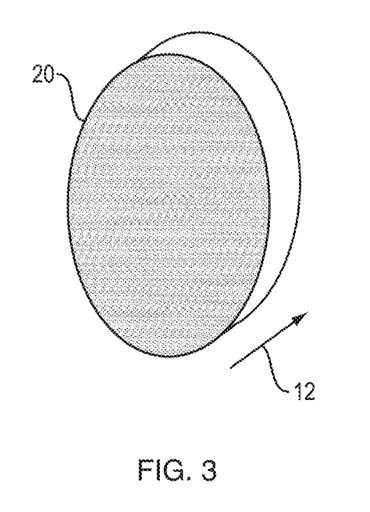
FIG. 3 is a schematic depiction of an optical faceplate.
Figure 4:
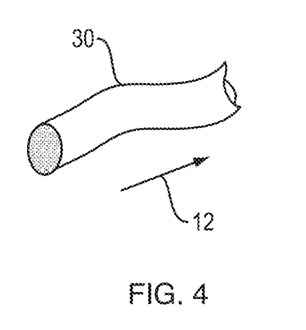
FIG. 4 is a schematic depiction of an optical fiber.

FIGS. 3 and 4 show two different realizations of the optical waveguide 10, namely a faceplate 20 (FIG. 3) and a fiber 30 (FIG. 4). The faceplate 20 is relatively broad transversely and short in the transmission direction, while the fiber 30 is narrow transversely and long in the transmission direction. A faceplate 20 and a fiber 30 may be used in a variety of applications including imaging applications, transmitting an image from one surface to the other surface without broadening as if the intervening space was not present. A fiber 30 may have other applications, including serving as an intermediate workpiece in creating a faceplate 20. Fibers and faceplates can also transfer other frequencies, such as Giga Hertz waves, any electromagnetic wave. They can be used to transfer any wave phenomenon (electromagnetics or matter waves), including but not limited to sound (acoustical waves), specifically ultrasonic waves. Faceplates can also be tapered to reduce or magnify the image (works with TAL material) Faceplates can also be inverted to make image inverters.

Conventional fibers and faceplates use total internal reflection (TIR) transmission, with fibers being composed of one or multiple cores surrounded by a cladding material, while faceplates (more accurately called fused-fiber optical faceplates) are formed by fusing together thousands to millions of core-clad fibers. TIR based fibers guide light by a core cladding interface, with a core that has higher refractive index and one or more claddings of a lower refractive index. The acceptance angle of the fiber (i.e., the angle with respect to the transmission direction that results in total internal reflection) is determined by the difference in the refractive index between the core and cladding. If light is directed into a TIR fiber at an angle that exceeds the acceptance angle, the light will not couple into the fiber and will escape. Likewise when a scintillating or wavelength shifting event occurs inside of a TIR fiber, the emitted light that exceeds the critical angle will not be guided down the core in the transmission direction and will be lost. Since scintillation is omnidirectional only a small percentage of the emitted light is within the critical angle of a TIR fiber and transmitted.

In contrast to TIR-based structures, the TAL effect does not rely on an acceptance angle or on a critical angle for light to be properly transmitted. Also, guiding light by TAL does not require a core/cladding structure. A TAL waveguide 10 (e.g., faceplate 20 or fiber 30, etc.) guides light over a broader range of incident angles than does a TIR waveguide. For example, a scintillating or wavelength shifting event emits light in an omnidirectional fashion, i.e. the emitted electromagnetic radiation is emitted in all directions equally and not just in the fiber transmission direction. Thus, a TIR faceplate receiving light from an adjacent scintillator layer does not transmit radiation that is not within the acceptance angle. As little as 3-5% of the total generated light may be transmitted. A similar result occurs even when the scintillator is within the TIR structure, because most of the emitted light will not be directed in the transmission direction.

In contrast, if light is generated by a scintillating or wavelength shifting event inside of a TAL faceplate 20 or fiber 30, the light will be predominantly guided along the direction that is relatively invariant in refractive index. The capture efficiency of the light event may be near 50%.

The improved faceplate structures may be fabricated of any materials and methods that provide a structure that has a random refractive index in two orthogonal dimensions (transverse) and an essentially invariant refractive index in the third orthogonal direction (longitudinal). The faceplate may include at least one material containing a wavelength shifting or scintillating material, and thus comprise both a faceplate wave transmitter and at least a part of a radiation detector.

It should be noted that the refractive index in the third orthogonal direction need not be completely invariant. Some perturbation or variation in index of refraction may be allowed, although it is preferable that it is more invariant as compared to the other two orthogonal directions. It should also be noted that some level of non-randomness in the direction of the random refractive index is allowable, if the level of non-randomness is of a scale that does not adversely affect the Anderson localization. For example, two identical regions of refractive index distribution may be present if their physical separation is arranged such that light traveling in one region is unable to sense the other region. This separation is dependent upon the specifics of the material(s). In one example, randomness need only extend for a distance of about five times the field diameter of a traveling radiation beam.

It should also be noted that although the provided examples are of electromagnetic radiation, other wave types, such as acoustic or sound waves, are also efficiently transmitted by similar mechanisms and using properly scaled versions of the described embodiments. In the acoustic embodiments the refractive index differences are referred to as acoustic impedance differences.

It should also be noted that TAL materials may be used as a part of a particle detector, such as a neutron detector. In this embodiment the TAL material might be directly attached to a neutron conversion layer such as lithium-6. The conversion layer produces scintillation at a first wavelength that is directed into the TAL medium, where a wavelength converting material, which is part of the TAL medium, converts the converted the first wavelength of light to a second wavelength, which is then directed by the TAL to an imager.

Embodiments of the improved arrangement include faceplates 10 composed of two materials, one with a higher refractive index and one with a lower refractive index. One or both of these materials contain a conversion material such as a scintillating or wavelength shifting dye. The two materials may be of equal mixture or they may be of unequal mixture. The randomness may be on a size scale where TAL occurs, for example, about 50-400 nanometers for visible light that is to be guided and transmitted.

Figure 5:
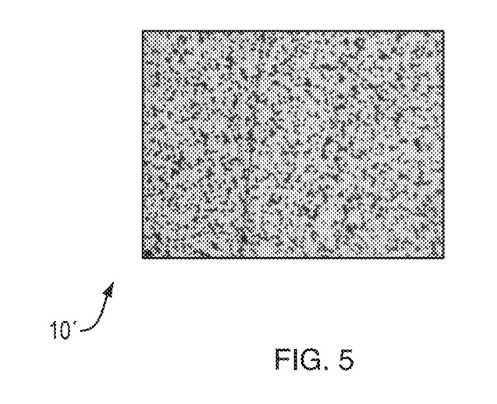
FIG. 5 is an image of a cross-sectional area of the optical waveguide.

FIG. 5 shows an alternative structure having two materials in an unequal mixture, in this example approximately 80/20. This is in contrast to the equal-mixture structure of FIG. 2.

In certain embodiments a faceplate 20 may comprise a single material with voids or regions absent of a solid material, filled with gas or air. In these embodiments the solid material acts as the material with a higher refractive index and contains the wavelength or scintillating material. The voids act as the material with a lower refractive index. The solid and nonsolid regions may be of equal volume, or may be of uneven mixture. The randomness may be on a size scale where Anderson localization occurs, preferably about three times the wavelength of the electromagnetic radiation that is desired to be guided.

In general, a faceplate 20 or fiber 30 may be composed of any number of materials and/or voids as long as there is a random distribution of refractive index in two orthogonal dimensions and essentially invariant in a third dimension. It is preferable that the refractive index difference between the materials be at least 0.01, and preferably 0.1 or more, so as to limit beam broadening according to Anderson localization theory.

The materials used to realize the waveguide 10 should not strongly absorb the electromagnetic radiation to be transmitted. Example materials that can be used include polymer and glass materials, and include but are not limited to the following examples:
1) Scintillating or wavelength shifting Polyvinyl Toluene (PVT) such as those produced by Saint-Gobain, REXON, Eljen Technologies, etc. and Poly(methyl methacrylate) (PMMA).
2) Scintillating or wavelength shifting Polystyrene (PS) such as those produced by Saint-Gobain, Epic Crystal, etc. and Poly(methyl methacrylate) (PMMA).

Scintillating, wave length shifting and florescence are examples of an active material, i.e., a material that does more than passively transmitting the wave. Phosphorescence and non-linear dyes are other examples of active material. A TAL waveguide that contains an active material as one of its components may improve the guidance capability of the emitted or altered product of the active material Scintillating fiber and wavelength shifting fibers find applications in national security, medicine, and materials research. Fibers using this technology can increase the sensitivity and range of devices and reduce the cost due to the roughly ten-fold increase in light output from the fiber.

Figure 6:
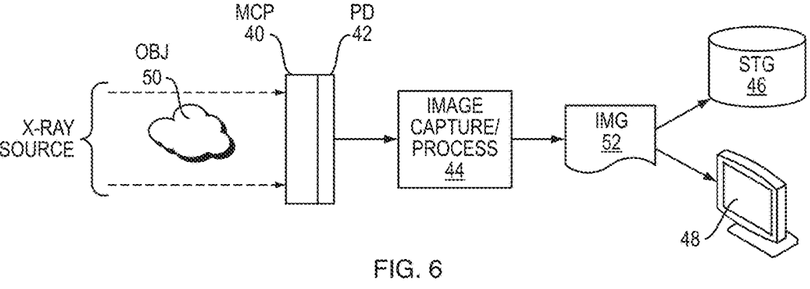
FIG. 6 is a block diagram of an X-ray imaging system.

FIG. 6 illustrates an application in which a scintillating faceplate is used to replace a conventional phosphor layer for an X-ray imaging application such as in manufacturing or medical imaging. In conventional X-ray imaging, the phosphor layer used to convert X-rays to visible light does not guide the light. The thickness of the phosphor layer must be limited to avoid excessive image blurring. Replacing the phosphor layer with an improved scintillating faceplate can increase resolution because the light is guided, and can reduce the amount of X-ray radiation needed to produce an image. The reduction in X-ray dose as compared to conventional X-ray imaging may be especially important in medical X-rays.

More specifically, the X-ray imaging system of FIG. 6 includes a converting faceplate 40 placed in immediate adjacency to a photodetector array (PD) 42. The system further includes an image capture/processing subsystem 44 as well as storage 46 and/or a display 48.

In operation, an object to be imaged 50 is placed between the faceplate 40 and a source of X-rays for a desired exposure duration. Within the faceplate 40, incident X-ray photons are converted into corresponding visible light which is guided to the PD 42. The PD 42 generates an electronic image signal that is provided to the image capture/processing subsystem 44, which processes this signal to produce image data representing an image (IMG) 52 to be stored in storage 46 and/or displayed on display 48.

Figure 7:
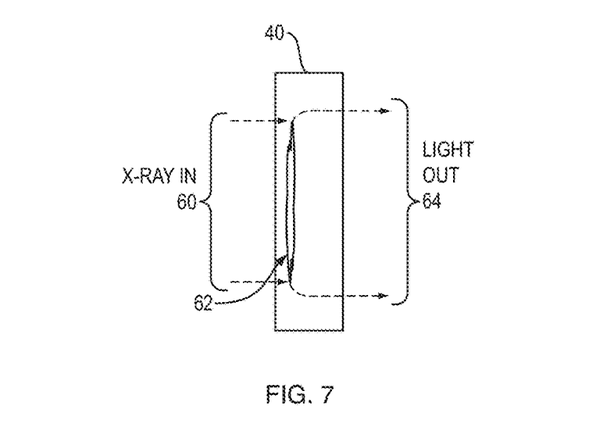
FIG. 7 is a schematic depiction of conversion and wave-guiding in a microchannel plate.

FIG. 7 is a schematic depiction of operation of the faceplate 40 in response to incident X-ray radiation (X-RAY IN) 60. The radiation 60 enters the faceplate 40 and encounters the scintillation material in an area 62, which results in the emission of visible light (LIGHT OUT) 64. As noted above, the light is emitted omnidirectionally, meaning that about half the light has a forward component to its travel. By TAL localization, most of that forward-component light is localized to form emitted light 64 that is provided to the PD 42 of FIG. 6.

Figure 8:
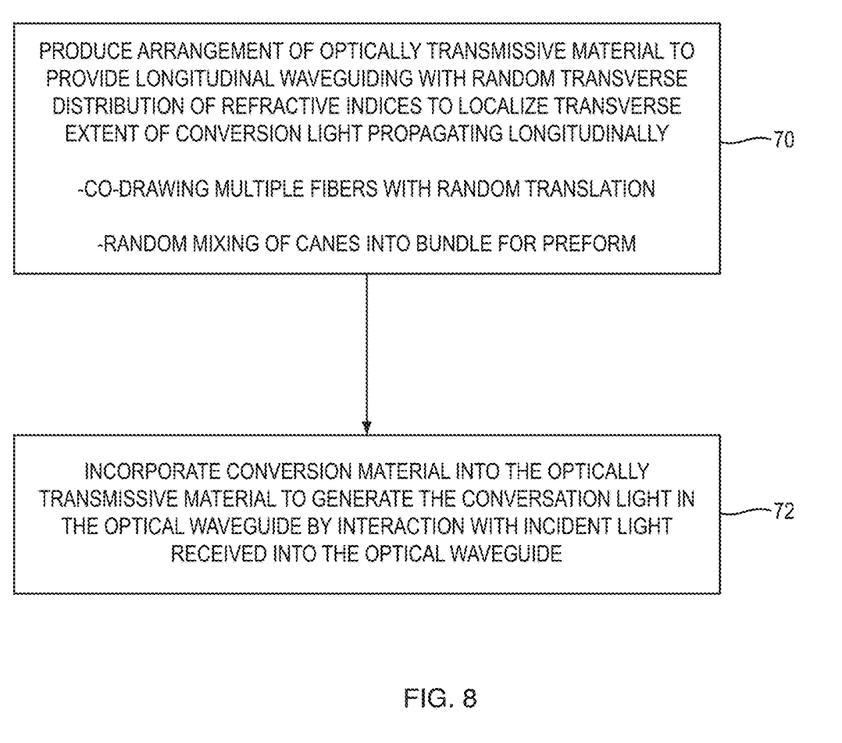
FIG. 8 is a flow diagram of a method of making an optical waveguide.

FIG. 8 is a high-level flow diagram of a method of producing the optical waveguide 10.

At 70, an arrangement of optically transmissive material is produced to provide longitudinal waveguiding with a random transverse distribution of refractive indices effective to localize a transverse extent of conversion light propagating longitudinally in the optical waveguide. As indicated, two different general approaches may be used. In one, multiple fibers are co-drawn (i.e., contemporaneously) with random translation of their crosswise locations, imparting the desired random transverse distribution. In the other, canes of materials with different refractive indices are mixed in a random fashion to form a fiber bundle that is subsequently used to make a preform for drawing into a fiber. Examples of these processes are described below.

At 72, a conversion material is incorporated into the optically transmissive material to enable the generation of the conversion light in the optical waveguide by interaction with incident radiation. Specific examples are given below. It should be noted that conversion material is generally put into the polymer or glass material first, before the material is used to create the optical waveguide.

Figure 9:
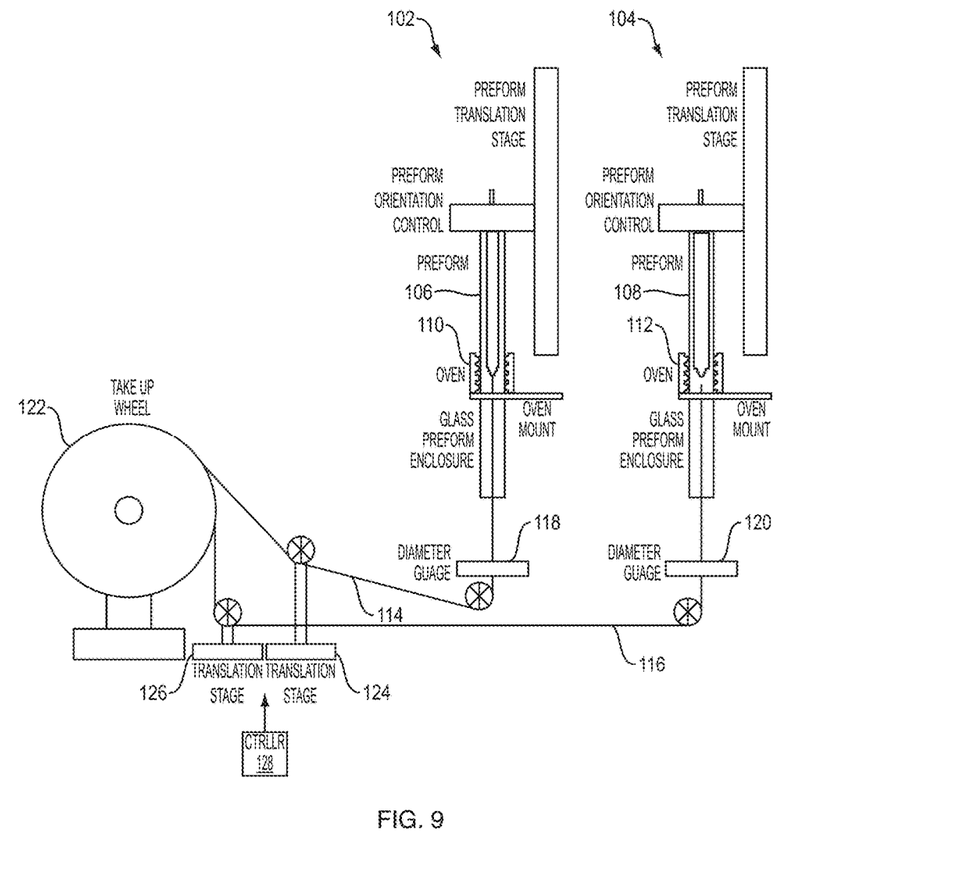
FIGS. 9 and 10 are schematic depictions of a system and method for making an optical waveguide.
Figure 10:
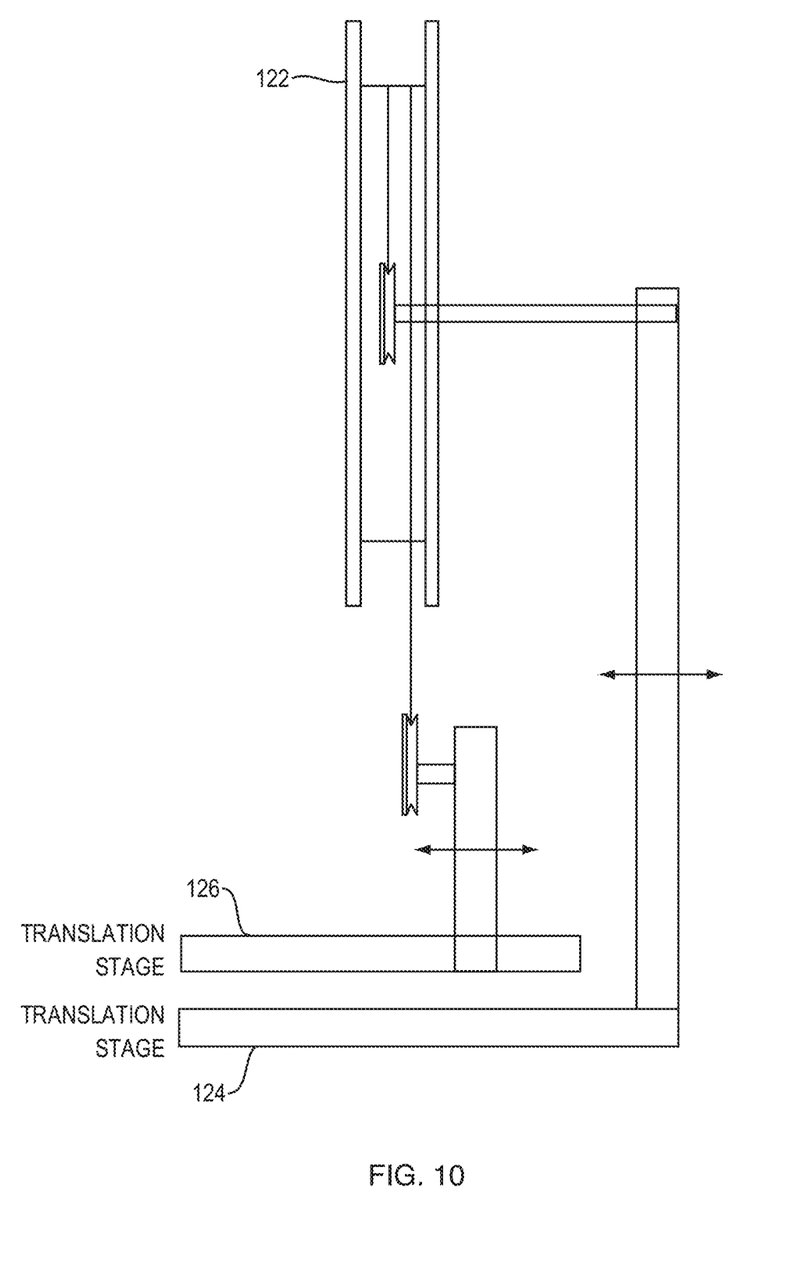

FIGS. 9 and 10 are schematics of a system and method for forming random areas of different index of refraction in a TAL type waveguide 10. The method includes iterations of drawing, bundling, and fusing, with all but the last iteration producing a preform that is used as the source of material for the next iteration. In the illustrated example there are two stations 102, 104 for respective initial preforms of two different materials, each having a selected different index of refraction. There may be more than two different materials, or more than two material drawing stations used.

At the stations 102, 104, preforms 106, 108 are slowly lowered into respective ovens 110, 112 for heating, then drawn into respective fibers 114, 116 of desired diameters. The feed rate and take-up rates are used to control the diameter of the material, which may be checked at diameter gauges 118, 120. Precise control may not be required due to the desire for randomness.

The fibers 114, 116 are wound around a take-up wheel 122. The placement of the fibers 114, 116 on the take-up wheel 122 is controlled with translations stages 124, 126, which are moved in a random way under the control of a controller 128 to obtain a random mixture of the two different index of refraction materials. Preferably this motion is provided such that there are no large areas of a single fiber type, and thus of a single index of refraction.

After a desired number of fiber segments are wound on the take-up wheel 122, the process is stopped. The fibers are cut and are removed from the wheel in a controlled manner, i.e. held together at several locations around the wheel. Each bundle of fibers is then made to conform to a desired cross-sectional shape, for example round, and fused under heat and pressure into a solid monolith. As indicated above, this monolith serves as a preform for a subsequent drawing process in all but the last iteration. Because the preform from the initial multi-fiber draw has a desired random transverse arrangement of materials, subsequent iterations may use only one preform rather than two as shown in FIG. 9, or if multiple preforms are used then the random motion of the translation stages 124, 126 may be dispensed with. In the last iteration, the monolith is cooled and then cut into faceplates 20. The final element size (i.e., mean transverse extent of individual regions of each material) is determined by the sizes used in the various draws.

Although the above describes the making of faceplates 20, it will be appreciated that the elongated fiber resulting from a final draw may alternatively be used as is.

Figure 11:
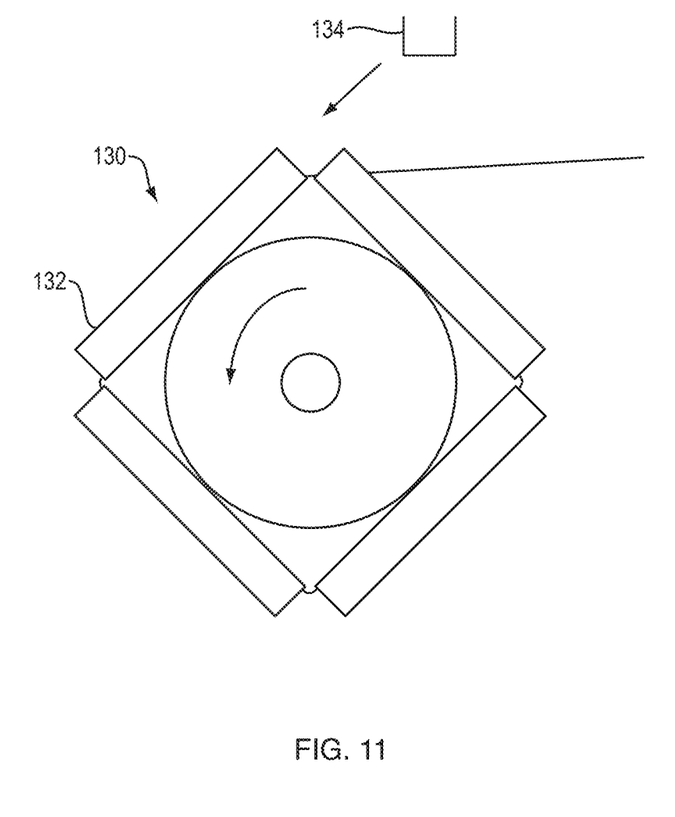
FIG. 11 is a schematic depiction of a fiber take-up wheel.

FIG. 11 shows an alternative take-up wheel 130, employing multiple flat channels 132 around its periphery. Each channel 132 has a U-shape cross section as indicated at 134. This structure more readily provides a desired shape for multiple fiber bundles to be used as preforms, in this case four linear bundles. Although a rectangular cross-section is shown, it will be appreciated that a hexagonal or circular cross-section may be employed to directly provide a desired cross sectional shape to the fiber bundle and resulting preform.

Specific Examples

The following provides specific examples. Generally a multistep process is used, and there are potentially many paths to a desired end point. In this case, the desired mixture is 80/20 PMMA/PS.

1. First draw 400 um PMMA and 200 um PS to fill 2 inch circle
2. Second draw into 2.56 mm canes and hand fill 2 inch circle or hex
3. Third stretch to 2.5 mm for 500 nm PS Other examples (150 um and 350 um machine pack):

| PS Elements | 5,000,000 | 5,000,000 | 259,200,000 | 259,200,000 |
|---|---|---|---|---|
| Final size | 2500 | 2500 | 18000 | 18000 |
| Final PS | 0.5 | 0.5 | 0.5 | 0.5 |
| Stretch ratio | 410 | 102 | 24 | 24 |
| Preform size | 1.99 | 0.99 | 3.47 | 3.47 |
| #fibers | 391 | 28,333 | 6,426 | 63,478 |
| Fiber size (um) | 2560 | 150 | 1100 | 350 |
| Preform size (in) | 1.99 | 1.05 | 2.65 | 2.25 |
| #fibers each | 12,788 | 176 | 40,333 | 4,083 |
| PS size (um) | 200 | 900 | 150 | 400 |
| PMMA size (um) | 400 | 1800 | 300 | 800 |

In the above description it is assumed that the initial fibers 114, 116 are of a single material, i.e., they lack a core/cladding structure. In alternative embodiments, it may be possible to use a hybrid structure for a conversion/scintillating fiber. For example, the fiber may have a core of scintillating material and a cladding of another material having a desired index in the multiple-index TAL scheme. In this case all of the core area and part of the cladding may be active, i.e., converting.

Additional applications for a faceplate or fiber as described herein include sound waves and Giga Hertz waves. Other applications will also be apparent to those skilled in the art.

While various embodiments of the invention have been particularly shown and described, it will be understood by those skilled in the art that various changes in form and details may be made therein without departing from the scope of the invention as defined by the appended claims.

What is claimed is:

1. An optical waveguide, comprising:
    optically transmissive material arranged to provide longitudinal waveguiding with a random transverse distribution of refractive indices effective to localize a transverse extent of conversion light propagating in the optical waveguide; and
    a conversion material incorporated into the optically transmissive material to generate the conversion light by interaction between the conversion material and incident radiation received into the optical waveguide.

2. The optical waveguide of claim 1, wherein the conversion material includes a scintillating material.

3. The optical waveguide of claim 2, wherein the scintillating material is a fluorescent material.

4. The optical waveguide of claim 2, wherein the scintillating material is effective to convert incident X-ray radiation into visible light.

5. The optical waveguide of claim 1, formed as a faceplate configured to convert a two-dimensional pattern of the incident radiation into a corresponding two-dimensional pattern of visible light.

6. The optical waveguide of claim 1, formed as an elongated optical fiber.

7. The optical waveguide of claim 1, wherein the optically transmissive material includes two or more materials of respective distinct refractive indices.

8. The optical waveguide of claim 7, wherein one or more of the materials includes the conversion material.

9. The optical waveguide of claim 7, wherein one or more of the materials is a non-converting material.

10. The optical waveguide of claim 7, wherein the two materials of unequal amounts.

11. The optical waveguide of claim 10, wherein the two materials are in a ratio of 70/30 or greater.

12. A method of making an optical waveguide, comprising:
    producing an arrangement of optically transmissive material arranged to provide longitudinal waveguiding with a random transverse distribution of refractive indices effective to localize a transverse extent of conversion light propagating longitudinally in the optical waveguide; and incorporating a conversion material into the optically transmissive material to generate the conversion light in the optical waveguide by interaction with incident radiation received into the optical waveguide.

13. The method of claim 12, wherein producing the arrangement of optically transmissive material includes:

in a first drawing process, contemporaneously drawing two or more unclad optical fibers of respective distinct refractive indices onto a drawing wheel to form a fiber bundle, the optical fibers being guided onto the drawing wheel through respective translation stages;

using the fiber bundle to produce a preform for use in a subsequent additional drawing process for the optical waveguide; and during the first drawing process, providing random-motion control signals to the translation stages to impart randomly varying transverse positioning of the optical fibers as they are drawn onto the drawing wheel and thereby produce a random transverse distribution of refractive indices in the preform and therefore in the optical waveguide as well.

14. The method of claim 13, wherein using the fiber bundle to produce the preform includes fusing together the fibers of the fiber bundle to form a monolith serving as the preform.

15. The method of claim 13, wherein the drawing wheel includes a set of discrete channels into which the fibers are drawn to create segments for respective fiber bundles, the fiber bundles being created by separating the segments from each other upon completion of the first drawing process.

16. The method of claim 15, wherein the channels are linear and have a cross-sectional shape corresponding to a desired cross-sectional shape of the fiber bundles.

17. The method of claim 12, wherein:

producing the arrangement of optically transmissive material includes mixing canes of optically transmissive materials to produce a cane bundle, and using the cane bundle to create a preform for use in a subsequent fiber drawing process, the optically transmissive materials having respective distinct refractive indices; and incorporating the conversion material includes utilizing first canes of a first optically transmissive material with the conversion material dispersed therein.

18. A method of making an optical waveguide, comprising:

in a first drawing process, contemporaneously drawing two or more unclad optical fibers of respective distinct refractive indices onto a drawing wheel to form a fiber bundle, the optical fibers being guided onto the drawing wheel through respective translation stages;

using the fiber bundle to produce a preform for use in a subsequent additional drawing process for the optical waveguide; and during the first drawing process, providing random-motion control signals to the translation stages to impart randomly varying transverse positioning of the optical fibers as they are drawn onto the drawing wheel and thereby produce a random transverse distribution of refractive indices in the preform and therefore in the optical waveguide as well.

19. A method of making an optical waveguide, comprising:

producing an arrangement of optically transmissive material arranged to provide longitudinal waveguiding with a random transverse distribution of refractive indices effective to localize a transverse extent of conversion light propagating longitudinally in the optical waveguide, wherein the arrangement includes three or more materials of respective distinct refractive indices.

\* \* \* \* \*